United States Patent
Hibi et al.

(10) Patent No.: US 7,397,947 B2
(45) Date of Patent: Jul. 8, 2008

(54) IMAGE PROCESSING APPARATUS, METHOD AND PROGRAM ABLE TO INFER THE COLOR SPACE OF IMAGE DATA

(75) Inventors: Yoshiharu Hibi, Ebina (JP); Masaru Okutsu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 799 days.

(21) Appl. No.: 10/725,422

(22) Filed: Dec. 3, 2003

(65) Prior Publication Data
US 2004/0228523 A1 Nov. 18, 2004

(30) Foreign Application Priority Data
May 15, 2003 (JP) ............................. 2003-136760

(51) Int. Cl.
*G06K 9/00* (2006.01)

(52) U.S. Cl. ..................................... 382/167; 382/162
(58) Field of Classification Search .................. None
See application file for complete search history.

(56) References Cited

U.S. PATENT DOCUMENTS

| | | | |
|---|---|---|---|
| 6,754,382 B1 * | 6/2004 | Borg ........................... 382/165 |
| 6,980,325 B1 * | 12/2005 | Sugiura et al. ................ 358/1.9 |
| 7,110,143 B2 * | 9/2006 | Bares et al. ................... 358/2.1 |
| 7,149,348 B1 * | 12/2006 | Borg ........................... 382/162 |
| 2002/0027603 A1 * | 3/2002 | Kuwata et al. ............... 348/232 |

* cited by examiner

Primary Examiner—Wenpeng Chen
Assistant Examiner—Yuzhen Ge
(74) Attorney, Agent, or Firm—Oliff & Berridge, PLC

(57) ABSTRACT

In an image processing apparatus, a controller infers a color space of image data that is to be processed, and performs a prescribed processing to the image data on the basis of information indicating the inferred color space.

25 Claims, 4 Drawing Sheets

| A | B | C | | |
|---|---|---|---|---|
| OBJECT | CHARACTERISTIC QUANTITY | SATURATION RANGE | HUE RANGE | ......... |
| aaaa | bbbb | s1-s2 | h1-h2 | ......... |
| cccc | dddd | s3-s4 | h3-h4 | ......... |
| ⋮ | ⋮ | ⋮ | ⋮ | ⋮ |

IMAGE PROCESSING APPARATUS, METHOD AND PROGRAM ABLE TO INFER THE COLOR SPACE OF IMAGE DATA

BACKGROUND OF THE INVENTION

1. Field of Invention

The present invention relates to an image processing apparatus, method and program which perform prescribed color-related processing on a color image.

2. Description of Related Art

Various methods for expressing color image data are available. For example, in a method using the RGB color space, the color of each pixel constituting image data is represented by luminance information of the three primary colors of red, green, and blue. In another method, the color of each pixel is represented by the ink primary colors of cyan (C), magenta (M), yellow (Y), and black (K). In such color representation methods that are generally device-dependent, colors having the same RGB values are seen as different colors according to the human visual sense depending on the color coordinates of primary colors used, the white point definition, etc. For example, the standard known as adobeRGB has a wider color range than the standard known as sRGB, which was established to serve as an HDTV color standard, and therefore colors having the same RGB values are seen differently according to these two standards. Similarly, a color according to the print color samples of "JapanColor" and a color according to those of "SWOP", which is a U.S. print standard, are seen (appear) differently even if they have the same CMYK values.

In recent years, to eliminate the above-described non-coincidence in color representation, image data formats have been developed in which image data contains information (color space identification information) indicating a color space that is used for expressing the image data. Specifically, a data format called "ICC (International Color Consortium) profile" and that includes color information is known.

However, the present situation is such that much of the conventional image data that are generated and used in many devices do not contain such color space identification information. For this reason, a method of using a pre-assumed color space and a method of causing a user to input color space identification information of image data are widely used when it is necessary to identify a color space to, for example, change color spaces.

However, in the method of using a pre-assumed color space, a desired processing result is not obtained if a color space actually employed is different from the assumed one. The method of causing a user to input color space identification information has a problem in that it is less convenient because the user needs to check a color space.

Further, even if image data contains color space identification information, there is a possibility that it is in error. Thus, there is a need for a method for checking the legitimacy of color space identification information contained in image data.

SUMMARY OF THE INVENTION

The present invention has been made in view of the above circumstances, and provides an image processing apparatus, method and program capable of easily generating and checking color space identification information relating to image data that is to be processed.

To address the problems in the art, one aspect of the invention provides an image processing apparatus having a controller that infers a color space of image data that is to be processed; and performs a prescribed processing to the image data on the basis of information indicating the inferred color space.

The controller may infer the color space of the image data by: (1) performing image recognition processing to the image data, the image recognition processing including recognizing a prescribed image portion of the image data as a predefined object; and (2) referring to color information that is set in advance as information representing a color of the predefined object recognized by the image recognition processing. Alternatively, the controller may infer the color space of the image data by using appended data that is input together with the image data, the appended data including at least one of information indicating a format of the image data, information including at least one of a date and time of generation of the image data, a date and time of last updating of the image data, and information indicating an editing history of the image data. The controller of each of the above image processing apparatus may further perform, on the image data, conversion processing from the inferred color space to another (reference) color space and present a result of the conversion processing to a user.

The controller may: (1) perform conversion processing into another (reference) color space on data generated on the basis of the image data while assuming that the color space of the image data is a color space indicated by each of plural preset items of color space candidate information, to thereby obtain plural conversion processing results corresponding to the respective items of color space candidate information; (2) present the plural conversion processing results to a user; (3) receive a manipulation of the user of selecting one of the plural conversion processing results; and (4) employ, as an inference result of the color space of the image data, a color space indicated by color space candidate information that corresponds to the conversion processing result selected by the manipulation of the user. In this case, the data generated on the basis of the image data may be either the image data itself or reduced data of the image data.

Another aspect of the invention relates to an image processing apparatus including a controller that judges whether information indicating a color space of image data, and which is appended to and input together with the image data, satisfies a prescribed condition; and performs a prescribed processing to the image data using the information indicating the color space if it is judged that the information indicating the color space satisfies the prescribed condition.

Another aspect of the invention relates to an image processing method using a computer, including the steps of inferring a color space of image data that is to be processed; and performing a prescribed processing to the image data on the basis of information indicating the inferred color space.

Another aspect of the invention relates to an image processing program for causing a computer to execute the steps of: inferring a color space of image data that is to be processed; and performing a prescribed processing to the image data on the basis of information indicating the inferred color space.

BRIEF DESCRIPTION OF THE DRAWINGS

Preferred exemplary embodiments of the present invention will be described in detail based on the following figures, in which.

DETAILED DESCRIPTION OF PREFERRED EMBODIMENTS

Figure 1:
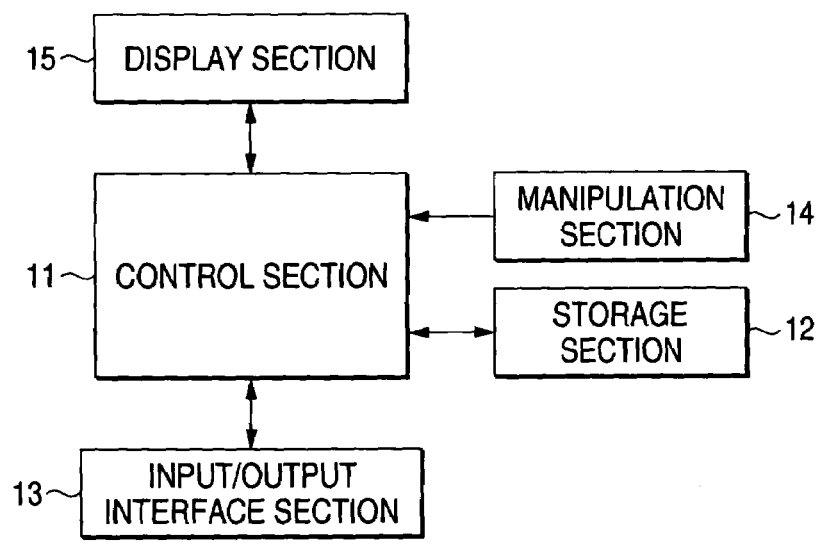
FIG. 1 is a block diagram showing the configuration of an image processing apparatus according to a first embodiment of the present invention.

A first embodiment of the present invention will be described hereinafter with reference to the drawings. As shown in FIG. 1, an image processing apparatus according to this embodiment is composed of a control section (controller) 11, a storage section 12, an input/output interface section 13, a manipulation section 14, and a display section 15.

The control section 11, which operates according to programs stored in the storage section 12, performs prescribed processing on image data as a subject of processing that is input through the input/output interface section 13, and outputs processed data to an external device through the input/output interface section 13. The details of processing performed by the control section 11 will be described later in detail. The storage section 12 includes a storage element such as, for example, a RAM and a disk device such as a hard disk drive. The storage section 12 operates as a computer-readable recording medium.

The input/output interface section 13 receives image data from an external device and supplies it to the control section 11. Further, the input/output interface section 13 outputs, to an external device, processed image data that is supplied from the control section 11. The manipulation section 14, which is, for example, a keyboard, a mouse, etc., supplies information indicating the contents of a manipulation by a user to the control section 11. The display section 15, which is, for example, a CRT display, an LCD display, or the like, presents image data to a user according to an instruction from the control section 11.

Figure 2:
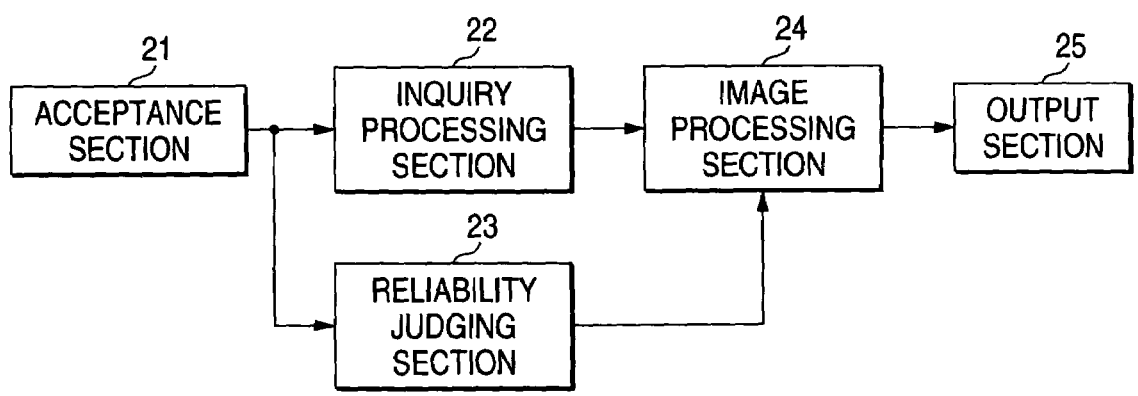
FIG. 2 is a functional block diagram of a control section (controller) 11 of the image processing apparatus of FIG. 1.

The details of processing performed by the control section 11 will be described below. As shown in FIG. 2, programs that are executed by the control section 11 include, in terms of functions, an acceptance section 21, an inquiry processing section 22, a reliability judging section 23, an image processing section 24, and an output section 25. It is assumed that data to be processed by the control section 11 has a structure that is prescribed by Exif (exchangeable image file format for digital still cameras). This data structure will not be described in detail because it is widely publicized by Japan Electronic Industry Development Association. The Exif data structure has appended information that includes various tags relating to (i.e., identifying) information. These tags include a tag relating to a version (e.g., a version of the Exif data structure (ExifVersion)), a tag relating to an image data characteristic (color space information (ColorSpace)), a tag relating to structure (e.g., image compression mode (CompressedBitsPerPixel)), a tag relating to user information, a tag relating to related file information, a tag relating to a date and time (a date and time of generation of original image data (e.g., DateTimeOriginal) and a date and time of generation of digital data (e.g., DataTimeDigitized)), and a tag relating to shooting conditions. Since the above items of information are additional items of information they (or some of them) may not be set.

The acceptance section 21 accepts image data and checks whether the image data contains color space information. If the image data does not contain color space information, the acceptance section 21 supplies the image data to the inquiry processing section 22. If the image data contains color space information, the acceptance section 21 supplies the image data to the reliability judging section 23.

The inquiry processing section 22 obtains plural color conversion processing results corresponding to respective items of color space candidate information for the received image data on the basis of a setting of the items of color space candidate information that is stored in the storage section 12 in advance, and causes the display section 15 to display those color conversion processing results. The inquiry processing section 22 causes a user to input, through the manipulation section 14, information indicating a color conversion processing result of a correct color conversion. Then, the inquiry processing section 22 judges that the color space candidate information corresponding to the thus-identified color conversion processing result indicates the color space of the image data concerned (i.e., the image data initially input), and outputs information indicating that color space. The details of the processing of the inquiry processing section 22 will be described later.

The reliability judging section 23 refers to the color space information that is appended to the image data and checks whether the color space information satisfies a predetermined condition. If the color space information does not satisfy the predetermined condition, the reliability judging section 23 supplies the image data to the inquiry processing section 22. If the color space information satisfies the predetermined condition, the reliability judging section 23 outputs the information of the color space indicated by the color space information that is appended to the image data. The details of the reliability judgment processing also will be described later.

In this embodiment, the inquiry processing section 22 and the reliability judging section 23 infer the color space of input image data and output a result of the inference. The image processing section 24 receives the information indicating the inferred color space from one of the inquiry processing section 22 and the reliability judging section 23, and performs prescribed image processing on the image data accepted by the acceptance section 21. The prescribed image processing can include, for example, color conversion of the image data, chroma, lightness, and contrast corrections, etc. The image processing section 24 may supply the image-processed image data to the output section 25 after causing the display section 15 to display image data that has been produced by the image processing and then receiving a manipulation of the user to the effect that the processing result is proper. The output section 25 receives the image-processed image data from the image processing section 24 and outputs it to an external device or the like.

The inquiry processing of the inquiry processing section 22 will be described below. In the following description it is assumed that a setting of items of color space candidate information is stored in advance in the color conversion candidates storage section 34 of the storage section 12. For example, the setting of items of color space candidate information is a set of items of information indicating color spaces that may be the color space of input image data.

First, the inquiry processing section 22 performs reduction processing on input image data and generates reduced image data. Then, the inquiry processing section 22 selects one item of color space candidate information from the setting of items of color space candidate information, and performs prescribed image processing while assuming that the reduced image data is expressed in the color space that is indicated by the selected color space candidate information. In other words, the inquiry processing section 22 performs the prescribed image processing on the reduced image data by using, as a source color space, the color space indicated by the selected color space candidate information. The prescribed image processing that is performed here may be, for example, color conversion processing from the color space indicated by the selected color space candidate information into another prescribed color space (i.e., a reference color space). The color space conversion is performed by a commonly known method using matrix operations or look-up tables, and will not be described in detail.

A result of the prescribed image processing is stored in the storage section 12 as inquiry image data in such a manner as to be correlated with the selected color space candidate information. The inquiry processing section 22 checks whether the setting of items of color space candidate information includes items of color space candidate information that have not been selected yet. If there exist such items of color space candidate information, the inquiry processing section 22 selects one of those items of color space candidate information and performs the prescribed image processing again for it.

When all the items of color space candidate information of the setting have been selected (i.e., there remains no unselected color space candidate information), the inquiry processing section 22 causes the display section 15 to display images based on the respective inquiry image data that are stored in the storage section 12.

Then, the inquiry processing section 22 waits for a user's manipulation on the manipulation section 14 for selecting one of the images. Upon selection of one image, the inquiry processing section 22 acquires the color space candidate information contained in the inquiry image data corresponding to the selected image and outputs the information of the color space that is indicated by the acquired color space candidate information.

That is, the inquiry processing section 22 assumes that input image data is expressed in each of plural assumed color spaces and performs image processing for each case. The inquiry processing section 22 presents individual image processing results to a user and causes the user to select image data that was processed correctly. This embodiment can reduce the processing load because image data as a subject of processing is reduced in advance. However, the reduction processing is not indispensable; the image processing may be performed on image data having the original size.

The processing of the reliability judging section 23 will be described below. For example, as shown in FIG. 3, in terms of functions, the reliability judging section 23 is composed of an object database 31, a preprocessing section 32, an area extracting section 33, a color conversion candidates storage section 34, a color conversion section 35, and a color judgment section 36.

Figures 3, 4:
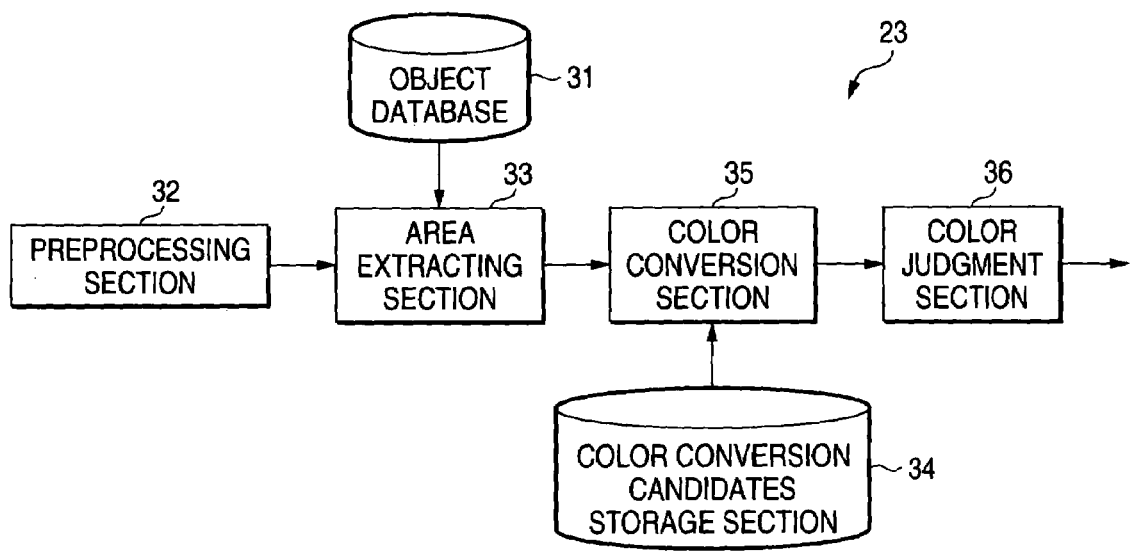
FIG. 3 is a functional block diagram of an example of a reliability judging section 23.
FIG. 4 outlines an example of the contents of an object database.
Figure 5:
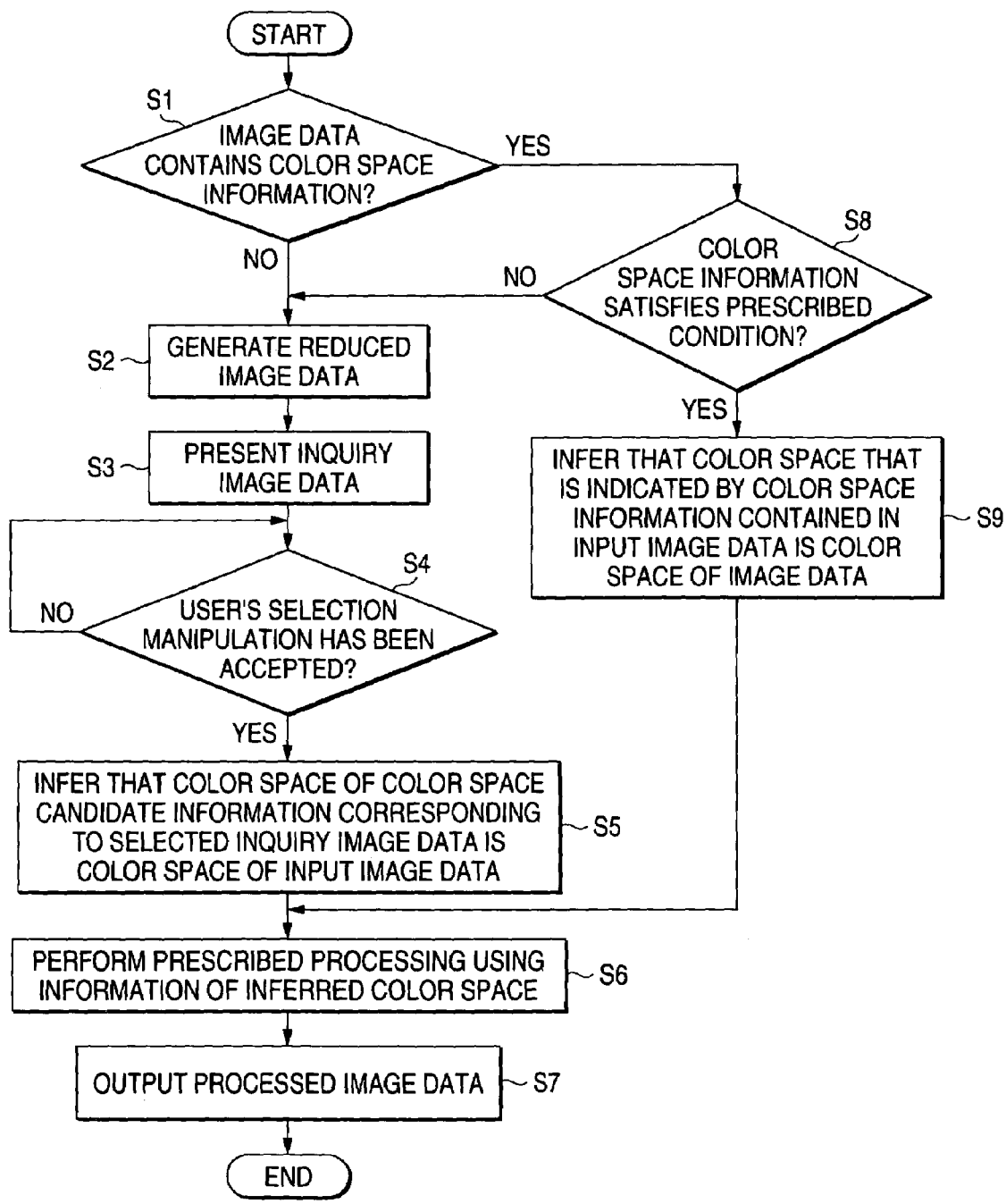
FIG. 5 is a flowchart showing an exemplary operation of the image processing apparatus of FIG. 1.

As shown in FIG. 4, in the object database 31, information A indicating an object, a characteristic quantity B for image recognition of the object, and reference color information C for color judgment are correlated with each other. If the object is a human face, for example, its characteristic quantity can be entropy, an outline shape, or the like. The reference color information C is information of a reference color that is expressed in a predetermined, specific color space (hereinafter referred to as "reference color space"). The reference color information C may be information indicating a saturation range, a hue range, etc. as shown in FIG. 4 or information indicating a target color (e.g., RGB values). Thus, object database 31 includes characteristic quantity information B and reference color information C for a plurality of predefined objects A.

The preprocessing section 32 performs prescribed preprocessing on image data as a subject of reliability judgment and supplies a processing result to the area extracting section 33. More specifically, the preprocessing may be conversion into luminance information. For example, in this embodiment, assume that it is known that input image data is expressed in a color space of RGB values. If it is unknown whether the RGB values are sRGB values, adobeRGB values, AppleRGB values, or the like, luminance information Y of each pixel is calculated according to the following Equation (1):

$$Y = 0.299R + 0.587G + 0.114B \tag{1}$$

where R, G, and B are RGB values of the image data. The calculated luminance information is supplied to the area extracting section 33.

The area extracting section 33 compares the luminance information obtained by the preprocessing with the characteristic quantities of the respective objects stored in the object database 31. If the image data has a range whose luminance information distribution meets a characteristic quantity, the area extracting section 33 identifies the range as an area of attention and outputs, as area-of-attention defining information, information for defining the area of attention and the information indicating the predefined object corresponding to the characteristic quantity thus met. The above processing performed by the preprocessing section 32 and the area extracting section 33 is processing that recognizes whether a predefined object stored in the object database 31 is contained in the image data and defines its area (i.e., its location in the image data). Such processing is not limited to the above-described one and may be any processing as long as it can define an area in the image data containing an object.

The color conversion section 35 converts the input image data into data of the reference color space while assuming that the input image data is expressed in the color space that is indicated by the color space information appended to the image data, and supplies a conversion result to the color judgment section 36. The color conversion section 35 uses information stored in the color conversion candidates storage section 34 in order to perform the conversion. In particular, the color conversion candidates storage section 34 stores conversion parameters (e.g., a conversion matrix or a look-up table) for each of a plurality of different color space standards (e.g., sRGB, adobeRGB, AppleRGB, etc.). (Hereafter, each set of conversion parameters stored in the storage section 34 is referred to as "item of color space candidate information.") Thus, the color conversion section 35 will use the item of color space candidate information (stored in section 34) that corresponds to the color space information appended to the image data in order to convert the image data into the reference color space. For example, if the appended data indicates adobeRGB, the color conversion section 35 will use the parameters (e.g., matrix or look-up table) stored in storage section 34 for adobeRGB to convert the image data into the reference color space, which is used in the color judgment section 36. The result of conversion is supplied to the color judgment section 36.

The color judgment section 36 extracts part of the image data received from the color conversion section 35 in the area defined by the area-of-attention defining information that is supplied from the area extracting section 33, and obtains statistical information by performing calculation using information relating to the colors of the pixels in the extracted area. (The term "statistical information" is used because this information may be statistical information such as a saturation histogram, a hue histogram, or an average color.) The color judgment section 36 compares the statistical information with the reference color information that is stored in the object database 31 and that is correlated with the information indicating the object that is contained in the area-of-attention defining information.

If it is found as a result of the comparison that a prescribed condition is satisfied, that is, values represented by the statistical information fall within the saturation, hue, and lightness ranges or the difference between its average color and the target color is smaller than a prescribed threshold value, the color judgment section 36 outputs the information of the color space that is indicated by the color space information that is appended to the image data. If the prescribed condition is not satisfied, the color judgment section 36 judges that the appended color space information is not reliable. Then the color conversion section 35 supplies the image data to the inquiry processing section 22 and causes it to perform processing of inquiring of a user a color space.

That is, in the reliability judgment processing, a portion whose color tone is known, for example, a skin color portion (in the case of a human face), is determined by image recognition processing and the reliability of information appended to image data is checked on the basis of whether the color of the thus-determined portion coincides with a predetermined color.

In this embodiment, the preprocessing, the color conversion processing, etc. are performed on image data having the original size. An alternative procedure is possible in which processing of reducing the size of input image data is performed and each of those kinds of processing is performed on reduced image data.

A basic operation of the image processing apparatus according to this embodiment will be described below. Image data that has been input through the input/output interface section 13 is stored in the storage section 12 as a subject of processing. The control section 11 starts processing according to programs stored in the storage section 12. First, at step S1, the control section 11 checks whether the image data as the subject of processing contains information indicating a color space (i.e., color space information). If the image data does not contain color space information ("no"), at step S2 the control section 11 starts processing of the inquiry processing section 22 and generates reduced image data on the basis of the image data. At step S3, the control section 11 assumes that each of plural preset items of color space candidate information is a source color space of the image data and performs color conversion processing into a prescribed color space. Then the control section 11 causes the display section 15 to display plural results obtained by the color conversion processing to present those to a user (inquiry image data presentation processing). At step S4, the control section 11 waits for acceptance of a selection by the user. Upon acceptance of a selection, at step S5 the control section 11 infers that the color space that is indicated by the color space candidate information corresponding to the selected color conversion processing result is the color space of the input image data. At step S6, the control section 11 performs prescribed image processing using the information of the inferred color space. At step S7, the control section 11 outputs, through the input/output interface section 13, image data that has been produced by the image processing. Then, the processing is finished.

At step S4, the user selects the most appropriate conversion result. However, if the list of conversion results being displayed on the display section 15 has no appropriate conversion result, the following operation may be performed. The user inputs information that specifies a color conversion such as a character string indicating a color space or matrix values to be used in a color conversion. The control section 11 then infers a color space on the basis of the information thus input.

If it is judged at step S1 that the image data contains color space information ("yes"), at step S8 the control section 11 performs processing of judging the reliability of that color space information and thereby judges whether the color space information satisfies a prescribed condition. If the color space information satisfies the prescribed condition, at step S9 the control section 11 judges that the color space information is reliable and employs the color space information itself contained in the image data as a color space inference result. The control section 11 proceeds to step S6, where the control section 11 causes execution of prescribed image processing that uses the information of the color space that was inferred at step S9. At step S7, the control section 11 outputs, through the input/output interface section 13, image data produced by the image processing. Then, the control section 11 finishes the processing. If it is judged at step S8 that the color space information does not satisfy the prescribed condition, the control section 11 judges that the color space information is not reliable and moves to step S2 to continue the processing described above from step S2 through step S7.

Although the reliability judgment processing utilizing image recognition processing was described above, the reliability judgment also can be performed by other methods. For example, since it is empirically known that employment of the sRGB color space is highly probable if the version (Exif Version) of an Exif data structure as information indicating an image data format is "2.2" or less, the reliability judgment may be performed in the following manner. If the version of an Exif data structure is "2.2" or less and the color space information of the appended information is "sRGB," the color space information is judged reliable and employed as an inference result as it is. If the version of an Exif data structure is "2.2" or less but the color space information of the appended information is not "sRGB," the color space information is judged unreliable and processing of the inquiry processing section 22 is started. If the version of an Exif data structure is greater than "2.2," the reliability may be judged by another method.

Another reliability judging method is as follows. A date and time when an image was generated (DateTimeOriginal) and a date and time when digital data was generated (DateTimeDigitized) are compared with each other by using tag information relating to the date and time. If they coincide with each other, it is judged that the image data has not been subjected to editing or the like and the color space information of the appended information is employed as an inference result as it is. If the date and time when the image was generated (DateTimeOriginal) and the date and time when the digital data was generated (DateTimeDigitized) do not coincide with each other, the color space information of the appended information is judged unreliable and processing of the inquiry processing section 22 is started.

A tag relating to user information, such as UserComment, may contain an editing history, because there are pieces of application software in which an editing history is set in a tag relating to user information. In view of this, the following reliability judgment method is possible. A color space used is inferred by referring to such a tag, more specifically, an editing history of color space conversion etc. and an inference result is compared with the color space information of the appended information. If coincidence is found, the color space information of the appended information is employed as an inference result. If coincidence is not found, the color space information of the appended information is judged unreliable and processing of the inquiry processing section 22 is started.

Instead of the human-involved method of the inquiry processing section 22, processing for inferring a color space without involvement of human hands can be realized by applying the above-described processing for judging the reliability of information indicating a color space that is appended to image data. An image processing apparatus according to a second embodiment of the invention which infers a color space without involvement of human hands (human input) will be described below.

Figure 6:
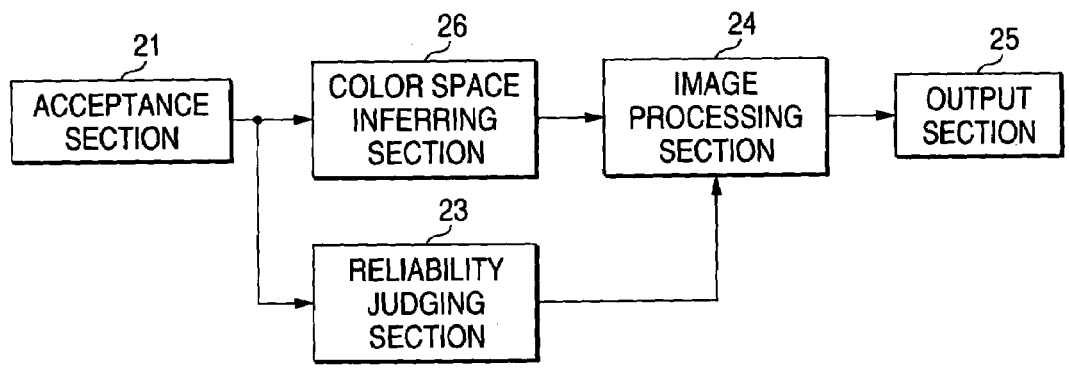
FIG. 6 is a functional block diagram of a control section (controller) 11 of an image processing apparatus according to a second embodiment of the invention.

The image processing apparatus according to the second embodiment of the invention is similar, in configuration, to the image processing apparatus according to the first embodiment shown in FIG. 1 and is somewhat different from the latter in the processing of the control section 11. Specifically, as shown in FIG. 6 instead of FIG. 2, programs to be executed by the control section 11 are formed by an acceptance section 21, a color space inferring section 26, a reliability judging section 23, an image processing section 24, and an output section 25.

Figure 7:
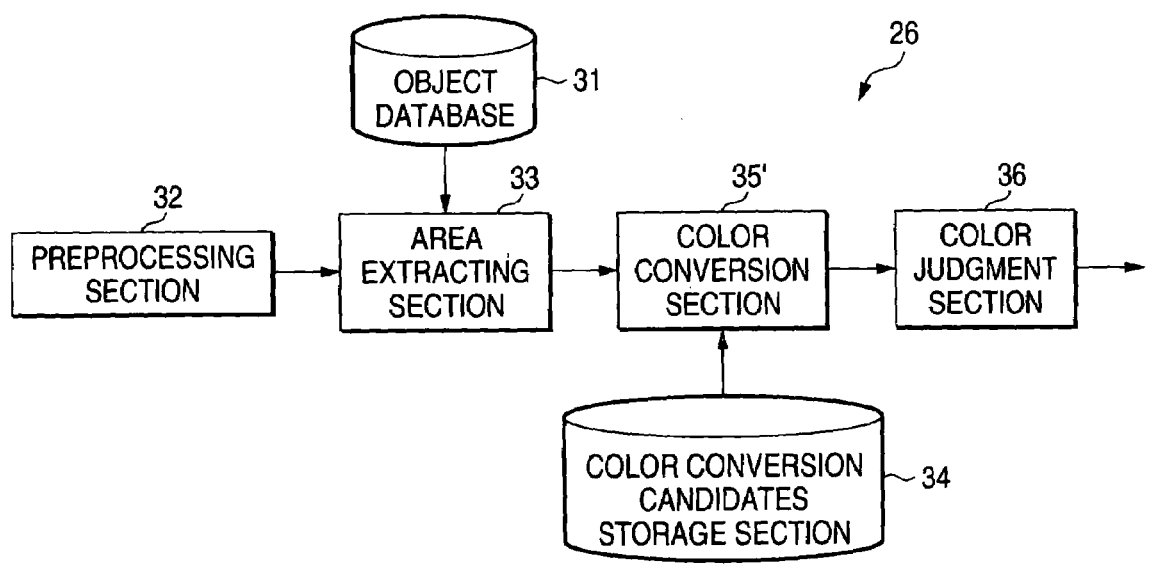
FIG. 7 is a functional block diagram of an example of a color space inferring section 26.

The color space inferring section 26 is approximately the same, in configuration, as the reliability judging section 23 and is different from the latter in the operation of the color conversion section 35 (35'). As shown in FIG. 7, the color space inferring section 26 includes, in terms of functions, an object database 31, a preprocessing section 32, an area extracting section 33, a color conversion candidate storage section 34, a color conversion section 35', and a color judgment section 36. In FIG. 7, the sections that can be shared with the reliability judging section 23 are given the same reference symbols as those of the reliability judging section 23.

As shown in FIG. 4, in the object database 31, information A indicating an object, a characteristic quantity B for image recognition of the object, and reference color information C for color judgment are correlated with each other. If the object is a human face, for example, its characteristic quantity can be entropy, an outline shape, or the like. The reference color information C may be information indicating a saturation range, a hue range, etc. as shown in FIG. 4 or information indicating a target color (e.g., RGB values).

The preprocessing section 32 performs prescribed preprocessing on image data as a subject of color space inference and supplies a processing result to the area extracting section 33. Specifically, the preprocessing may be conversion into luminance information. For example, in this embodiment, assume that it is known that the input image data is expressed in a color space of RGB values. If it is unknown whether the RGB values are sRGB values, adobeRGB values, AppleRGB values, or the like, luminance information Y of each pixel is calculated according to Equation (1) where R, G, and B are RGB values of the image data. The calculated luminance information is supplied to the area extracting section 33.

The area extracting section 33 compares the luminance information obtained by the preprocessing with the characteristic quantities of the respective predefined objects stored in the object database 31. If the image data has a range whose luminance information distribution meets a characteristic quantity, the area extracting section 33 identifies the range as an area of attention and outputs, as area-of-attention defining information, information for defining the area of attention and the information indicating the predefined object corresponding to the characteristic quantity thus met. The above processing performed by the preprocessing section 32 and the area extracting section 33 is processing that recognizes whether a predefined object stored in the object database 31 is contained in the image data and defines its area (what is called image recognition processing). Such processing is not limited to the above-described one and may be any processing as long as it can define an area containing an object.

The color conversion section 35' performs color conversion processing on the image data that has not been subjected to the preprocessing in order to convert that image data into the color space indicated by the reference color information stored in the object database 31 using the color space conversion parameters indicated by each color space candidate information (i.e., each item of color space information) stored in the color conversion candidate storage section 34 as a source color space.

More specifically, this processing is performed as follows in the same manner as in the inquiry processing section 22. One item of color space candidate information (e.g., the parameters for sRGB, adobeRGB or AppleRGB) is selected from the setting of items of color space candidate information. Color conversion processing is performed to convert the image data into the reference color space while assuming that the image data is expressed in the color space indicated by the selected color space candidate information. A conversion result is stored in the storage section 12 so as to be correlated with the selected color space candidate information. Then, it is checked whether there remain unselected items of color space candidate information in the color conversion candidates storage section 34. If there remain unselected items of color space candidate information, one of them is selected and color conversion processing is again performed for it.

When all the items of color space candidate information (i.e., each of sRGB, adobeRGB and AppleRGB in the present example) of the setting have been selected (i.e., there remains no unselected color space candidate information), the color space inferring section 26 judges that the processing has been completed and supplies a notice to that effect to the color judgment section 36.

Receiving, from the color conversion section 35', the notice to the effect that the processing has been completed, the color judgment section 36 obtains plural items of statistical information by calculating, for each of the plural color conversion processing results stored in the storage section 12 as corresponding to the respective items of color space candidate information, information relating to colors in the area defined by the area-of-attention defining information that is supplied from the area extracting section 33. (The term "statistical information" is used because this information may be statistical information such as a saturation histogram, a hue histogram, or an average color.) The color judgment section 36 compares each of the plural calculated items of statistical information with the reference color information that is stored in the object database 31 so as to be correlated with the information indicating the predefined object that is contained in the area-of-attention defining information.

By making the comparison, the color judgment section 36 finds statistical information that satisfies a prescribed condition, that is, such statistical information that has values represented by it which fall within the saturation, hue, and lightness ranges or that has a difference between its average color and the target color which is smaller than a prescribed threshold value. The color judgment section 36 outputs the information of the color space that is indicated by the color space candidate information corresponding to the statistical information thus found.

That is, in the color space inference processing, a portion whose color tone is known, for example, a skin color portion (in the case of a human face), is determined by image recognition processing and a color space in which the original image data is expressed is inferred on the basis of whether the color of the thus-determined portion coincides with a predetermined color.

In the color space inferring section 26, the color space inference processing may be performed on reduced image data that is obtained by reducing the size of image data as a subject of processing in or before the pre-processing.

The operation of this embodiment will be described below. Image data that has been input through the input/output interface section 13 is stored in the storage section 12 as a subject of processing. The control section 11 starts processing according to programs stored in the storage section 12. First, the control section 11 checks whether image data as a subject of processing contains information indicating a color space. If the image data does not contain color space information, the control section 11 starts processing of the color space inferring section 26 and obtains an inference result of a color space of the image data as the subject of processing. Then, the control section 11 causes execution of prescribed image processing that uses the information of the inferred color space. The control section 11 outputs, through the input/output section 13, image data produced by the image processing and finishes the processing.

If the image data as the subject of processing contains color space information, the control section 11 (i.e., reliability judging section 23) performs processing of judging the reliability of the color space information, and infers a color space. Specifically, the reliability judging section 23 judges whether the color space information satisfies a prescribed condition. If the prescribed condition is not satisfied, processing of the color space inferring section 26 may be performed. If the prescribed condition is satisfied, the color space information itself contained in the image data may be employed as a color space inference result.

Subsequently, the control section 11 causes execution of prescribed image processing that uses the color space information that has been judged reliable by the reliability judging section 23 or the information of the color space inferred by the color space inferring section 26. The control section 11 outputs, through the input/output section interface 13, image data produced by the image processing and finishes the processing.

As described above, the use of the color space inferring section 26 makes it possible to infer the color space of image data as a subject of processing without the need for inquiring of a user. That is, if no color space information is appended to image data, or if color space information is judged unreliable even if it is appended to image data, the color space inferring section 26 infers a color space and the image processing section 24 performs prescribed image processing on the basis of an inference result.

In the image processing apparatus according to this embodiment, information indicating an inferred color space may be incorporated into image data as a subject of processing. More specifically, the control section 11 (i.e., image processing section 24) incorporates color space information as an inference result into Exif-format image data in the form of a color space tag (ColorSpace).

In the image processing apparatus according to this embodiment, the following processing may be performed. Color space inference results of respective image data as subjects of processing are subjected to statistical processing, and frequencies of occurrence of items of information indicating the color spaces obtained by the inference processing are stored. The stored frequencies of occurrence are used for later inference processing or image data output processing. More specifically, the control section 11 (i.e., inquiry processing section 22) selects items of color space candidate information in order of frequencies of occurrence of color spaces of past inference results, and causes the display section 15 to display, in the order of frequencies of occurrence, processing results obtained by using, as source color spaces, the color spaces indicated by the respective selected items of color space candidate information.

The above description is directed to the exemplary case in which the color space of image data as a subject of processing is basically an RGB space such as the sRGB space or the adobeRGB space. However, the image processing apparatus according to the invention is not limited to such a case.

For example, the image processing apparatus according to the embodiments can also be applied to a case of inferring a print standard such as "JapanColor" or "SWOP" for an image that is expressed in a CMYK color space. In this case, the above embodiments can be used by performing a CMYK-to-RGB conversion. The image processing apparatus according to the embodiments can also be used in inferring which of RGB and HSB color space representations is used.

Although the above description is directed to the exemplary case of the Exif format, the invention can also be applied to cases of other image formats.

The controller (e.g., the control section 21) of the illustrated exemplary embodiments is implemented as one or more programmed general purpose computers. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

What is claimed is:

1. An image processing apparatus comprising:
   determining means for determining whether image data to be processed includes color space information identifying a color space in which the image data is defined;

inferring means for determining the color space of the image data that is to be processed based on characteristics of the image when the determining means determines that the image data does not include color space information identifying the color space; and processing means for performing a prescribed processing to the image data on the basis of information indicating the color space determined by the inferring means, wherein the inferring means: (1) performs conversion processing into another color space on data generated on the basis of the image data while assuming that the color space of the image data is a color space indicated by each of plural preset items of color space candidate information, to thereby obtain plural conversion processing results corresponding to the respective items of color space candidate information; (2) presents the plural conversion processing results to a user; (3) receives a manipulation of the user of selecting one of the plural conversion processing results; and (4) determines the color space of the image data to be a color space indicated by color space candidate information that corresponds to the conversion processing result selected by the manipulation of the user.

2. The image processing apparatus according to claim 1, wherein the inferring means determines the color space of the image data by: (1) performing image recognition processing to the image data, the image recognition processing including recognizing a prescribed image portion of the image data as a predefined object; and (2) referring to color information that is set in advance as information representing a color of the predefined object recognized by the image recognition processing.

3. The image processing apparatus according to claim 2, further comprising means for performing, on the image data, conversion processing from the determined color space to another color space and for presenting a result of the conversion processing to a user.

4. The image processing apparatus according to claim 2, wherein the color information that is set in advance includes at least one or more of: information indicating a saturation range, information indicating a hue range, and information indicating a target color.

5. The image processing apparatus according to claim 1, wherein the inferring means determines the color space of the image data by using appended data that is input together with the image data, the appended data including at least one of information indicating a format of the image data, information including at least one of a date and time of generation of the image data, a date and time of last updating of the image data, and information indicating an editing history of the image data.

6. The image processing apparatus according to claim 5, further comprising means for performing, on the image data, conversion processing from the determined color space to another color space and for presenting a result of the conversion processing to a user.

7. The image processing apparatus according to claim 1, further comprising means for performing, on the image data, conversion processing from the determined color space to another color space and for presenting a result of the conversion processing to a user.

8. The image processing apparatus according to claim 1, wherein the data generated on the basis of the image data is one of the image data and reduced data of the image data.

9. An image processing apparatus comprising:

a controller that: (1) determines whether image data to be processed includes color space information identifying a color space in which the image information is defined; (2) determines a color space of the image data that is to be processed based on characteristics of the image data when the controller determines that the image data does not include color space information identifying the color space of the image data; and (3) performs a prescribed processing to the image data on the basis of information indicating the color space that was determined, wherein the controller: (1) performs conversion processing into another color space on data generated on the basis of the image data while assuming that the color space of the image data is a color space indicated by each of plural preset items of color space candidate information, to thereby obtain plural conversion processing results corresponding to the respective items of color space candidate information; (2) presents the plural conversion processing results to a user; (3) receives a manipulation of the user of selecting one of the plural conversion processing results; and (4) determines the color space of the image data to be a color space indicated by color space candidate information that corresponds to the conversion processing result selected by the manipulation of the user.

10. The image processing apparatus according to claim 9, wherein the controller determines the color space of the image data by: (1) performing image recognition processing to the image data, the image recognition processing including recognizing a prescribed image portion of the image data as a predefined object; and (2) referring to color information that is set in advance as information representing a color of the predefined object recognized by the image recognition processing.

11. The image processing apparatus according to claim 10, wherein the controller also performs, on the image data, conversion processing from the determined color space to another color space and for presenting a result of the conversion processing to a user.

12. The image processing apparatus according to claim 10, wherein the color information that is set in advance includes at least one or more of: information indicating a saturation range, information indicating a hue range, and information indicating a target color.

13. The image processing apparatus according to claim 9, wherein the controller determines the color space of the image data by using appended data that is input together with the image data, the appended data including at least one of information indicating a format of the image data, information including at least one of a date and time of generation of the image data, a date and time of last updating of the image data, and information indicating an editing history of the image data.

14. The image processing apparatus according to claim 13, wherein the controller also performs, on the image data, conversion processing from the determined color space to another color space and for presenting a result of the conversion processing to a user.

15. The image processing apparatus according to claim 9, wherein the controller also performs, on the image data, conversion processing from the determined color space to another color space and for presenting a result of the conversion processing to a user.

16. The image processing apparatus according to claim 9, wherein the data generated on the basis of the image data is one of the image data and reduced data of the image data.

17. An image processing method using a computer, comprising the steps of:

determining whether image data to be processed includes color space information identifying a color space in which the image data is defined;

determining a color space of the image data that is to be processed based on characteristics of the image data when the image data is determined to not include color space information; and performing a prescribed processing to the image data on the basis of information indicating the determined color space, wherein the step of determining a color space includes: (1) performing conversion processing into another color space on data generated on the basis of the image data while assuming that the color space of the image data is a color space indicated by each of plural preset items of color space candidate information, to thereby obtain plural conversion processing results corresponding to the respective items of color space candidate information; (2) presenting the plural conversion processing results to a user; (3) receiving a manipulation of the user of selecting one of the plural conversion processing results; and (4) employing, as an inference result of the color space of the image data, a color space indicated by color space candidate information that corresponds to the conversion processing result selected by the manipulation of the user.

18. The image processing method according to claim 17, wherein the step of determining a color space includes: (1) performing image recognition processing to the image data, the image recognition processing including recognizing a prescribed image portion of the image data as a predefined object; and (2) referring to color information that is set in advance as information representing a color of the predefined object recognized by the image recognition processing.

19. The image processing method according to claim 18, further comprising the step of performing, on the image data, conversion processing from the determined color space to another color space and for presenting a result of the conversion processing to a user.

20. The image processing method according to claim 18, wherein the color information that is set in advance includes at least one or more of: information indicating a saturation range, information indicating a hue range, and information indicating a target color.

21. The image processing method according to claim 17, wherein the step of determining a color space includes using appended data that is input together with the image data, the appended data including at least one of information indicating a format of the image data, information including at least one of a date and time of generation of the image data, a date and time of last updating of the image data, and information indicating an editing history of the image data.

22. The image processing method according to claim 21, further comprising the step of performing, on the image data, conversion processing from the determined color space to another color space and for presenting a result of the conversion processing to a user.

23. The image processing method according to claim 17, further comprising the step of performing, on the image data, conversion processing from the determined color space to another color space and for presenting a result of the conversion processing to a user.

24. The image processing method according to claim 17, wherein the data generated on the basis of the image data is one of the image data and reduced data of the image data.

25. A computer-readable medium storing an image processing program for causing a computer to execute the steps of:

determining whether image data that is to be processed includes color space information identifying a color space in which the image data is defined;

determining a color space of the image data that is to be processed based on characteristics of the image data when the image data is determined to not include color space information; and performing a prescribed processing to the image data on the basis of information indicating the determined color space, wherein the step of determining a color space includes: (1) performing conversion processing into another color space on data generated on the basis of the image data while assuming that the color space of the image data is a color space indicated by each of plural preset items of color space candidate information, to thereby obtain plural conversion processing results corresponding to the respective items of color space candidate information; (2) presenting the plural conversion processing results to a user; (3) receiving a manipulation of the user of selecting one of the plural conversion processing results; and (4) employing, as an inference result of the color space of the image data, a color space indicated by color space candidate information that corresponds to the conversion processing result selected by the manipulation of the user.

\* \* \* \* \*